US006199117B1

(12) United States Patent
Cox et al.

(10) Patent No.: US 6,199,117 B1
(45) Date of Patent: *Mar. 6, 2001

(54) GENERALIZED CONTROL FOR STARTING OF TASKS (PROCESSES AND THREADS)

(75) Inventors: Daryl Cox, Bedford; John Gabbard, Keller; Sally Zuponcic, Hurst, all of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/860,386

(22) Filed: Mar. 30, 1992

(51) Int. Cl.$^7$ ............................... G06F 9/54; G06F 9/455
(52) U.S. Cl. ................................ 709/328; 703/27
(58) Field of Search ...................... 395/500, 650, 395/700; 703/23, 26, 27; 717/1, 2, 3, 5; 709/313, 319, 318, 320, 328, 329, 321

(56) References Cited

U.S. PATENT DOCUMENTS

| | | | | |
|---|---|---|---|---|
| 4,755,922 | * | 7/1988 | Diedrich ............................... | 364/200 |
| 5,097,533 | * | 3/1992 | Burger et al. ......................... | 709/302 |
| 5,129,286 | * | 7/1992 | Cogle, Jr. et al. ..................... | 395/650 |
| 5,430,836 | * | 7/1995 | Wolf et al. ............................ | 345/335 |
| 5,526,523 | * | 6/1996 | Straub et al. ......................... | 713/100 |
| 5,901,313 | * | 5/1999 | Wolf et al. ............................ | 345/335 |

OTHER PUBLICATIONS

IBM Technical Disclosure Bulletin; "Making System Service Interfaces Standard Across Different Operating Systems", J.D. Argo & R.M. Spunt; vol. 15, No. 10, Mar. 1973; p. 3197.

"Inter–processor communication and Ada in distributed real–time systems"; Kjell Nielsen and Harald Carlsso; 1990 butterworth–Heinemann Ltd; vol. 13, No. 8; Oct. 1990; pp. 451–459.

Jones et al., "In search of the ideal operating system for user interface", ACM SIGGRAPH, ACM, 1990, pp 31–35.*

Jensen et al., "Building an APL2 X–Windows Interface for VM and AIX with a general APL2–to–C Interface", ACM, 1991, pp 212–222.*

Ohta et al., "Software portability in TRON", IEEE, 1991, pp 86–92.*

* cited by examiner

Primary Examiner—Kakali Chaki
(74) Attorney, Agent, or Firm—McGuireWoods, LLP; Edward H. Duffield, Esq.

(57) ABSTRACT

A generalized applications programming interface (API) is inserted as a separate level above the API's of the operating system in a data processing system and used to invoke a group of operating system API's having similar functions, such as the starting of sessions, processes and threads in the OS/2™ operating system. The generalized API includes at least one parameter which contains coded information specifying a plurality of parameters which must be specified to invoke an operating system level API. The function of decoding the parameter relieves the programmer of the burden of separately specifying each parameter and flag of the operating system level API to be invoked. The use of a generalized API further relieves the programmer from the burden of detailed knowledge of the plural operating system level API's of the group and renders them transparent. Since the generalized API is arranged to output code to invoke the operating system level API's, substitution of code to be output allows application of the generalized API to different operating systems. Accordingly, the generalized code in an application program, permitted by the generalized API, permits programs to be developed which are not operating system specific and which can then be ported between data processors regardless of the operating system existing on such data processors.

35 Claims, 4 Drawing Sheets

GENERALIZED CONTROL FOR STARTING OF TASKS (PROCESSES AND THREADS)

DESCRIPTION

BACKGROUND OF THE INVENTION

1. Field of the Invention

The present invention generally relates to application programming interfaces (API's) and, more particularly, to API's for starting tasks in accordance with the OS/2™ (trademark of International Business Machines Corp.) operating system.

2. Description of the Prior Art

Central to the useful operation of any data processing equipment is the so-called operating system. The operating system is usually established by software which provides operations that the data processing equipment can then perform in response to commands entered by an operator or in accordance with a program. Numerous successful operating systems have been developed in the past, such as MS-DOS™ (a trademark of Microsoft, Inc.), and UNIX™ (a trademark of Bell Laboratories). Such operating systems establish the basic system operations, including application programming interfaces, which the data processor can perform and the manner in which they are performed within the data processor.

A recently developed operating system which supports a multi-tasking operational mode (e.g. the effectively simultaneous performance of a number of data processing functions) is known as OS/2™. In multi-tasking, different tasks must be designed as distinct executable units which can be performed simultaneously or at least without regard to order among tasks in a particular category. In OS/2™, the basic unit for execution by the data processor is referred to as a thread. A thread also provides a context within which a program or portion thereof corresponding to the thread is to be executed by the processor. This context includes registers, a stack and the CPU mode which will be utilized in executing the thread.

A process is a collection of system resources such as threads, memory, files, devices, pipes, queues, etc. which are allocated to a particular program and must contain a minimum of one thread. OS/2™ also provides so-called sessions which are collections of one or more processes associated with a virtual console which may be constituted by a keyboard, display or mouse. Sessions can, however, be regarded as simply another form of process for purposes of understanding the present invention. As used herein, the term "task" is to be understood as generic to both threads and processes in OS/2™ as well as corresponding types of operations in other operating systems.

There is no hierarchy among threads within a process even though threads can create other threads. Once initiated, a thread is regarded as a peer of all other threads running in the process. Contention for the CPU is normally resolved with respect to particular resources, such as memory or files by the setting and resetting of flags.

A hierarchy can, however, exist among processes and a process may also create other processes. The hierarchy among processes is commonly referred to in parent-child terminology. Between parent and child processes, each containing threads which compete for CPU time, some contention is resolved by providing for suspension of the parent process while the child process executes, such as when the child process is used to generate display of a directory. An example of a process where parent and child execute concurrently would be where the child process prints a file or document in the background while the parent continues to execute, being interrupted briefly from time to time for communication to the printer by the child process.

This hierarchy allows one or more applications programs to be broken down into portions which potentially are simultaneously executable in order to improve system performance. It should be understood that the portions of such applications programs need not be and, in a rigorous technical sense, seldom are, actually performed simultaneously by the CPU of the data processing system. However, dynamically allocating time slots to these program portions and executing them in rapid sequence at the convenience of the processor (e.g. in an order which resolves contention for shared resources) causes the resulting concurrent execution of processes and threads to appear to be simultaneous and greatly improves system performance.

Specifically, when OS/2™ starts a program, it first creates a process to own the necessary resources. Then it loads the program and starts a thread within the process to run the code. As threads from different processes are run, ownership of resources accessible by various threads is established and re-established in accordance with the process. For example, when thread 1 is run in process A, it has access to the resources of process A and when thread 1 is run in process B, it has access to the resources of process B. In this way, contention for shared resources is usually resolved easily. This operation is enhanced by the fact that resources may be dynamically acquired and released from particular processes.

The above and other features of the OS/2™ operating system are detailed in a publication entitled "OS/2 Programmer's Guide", by Ed Iaccobucci, published by Osborne McGraw-Hill, Inc., 1988, which is hereby fully incorporated by reference for further description of the OS/2™ operating system.

The provision of such a hierarchy of threads, processes and sessions to improve processor performance causes complications in programming because each of these executable types of operations necessarily has a different structure. For instance, within OS/$_2$™, any one of four system level application programming interfaces (e.g. DosCreateThread, DosStartSession, DosExecProgram and begin_thread) may be required to start a thread or process. A comparable number of other system level application programming interfaces (API's) would be required in other operating system application architectures capable of multi-tasking operation.

Each operation which may be contained in a thread must cause appropriate operation of the system application architecture (SAA) on which it is to be performed. Since different system application architectures (SAA's) such as MVS, VM, OS400, and other operating systems handle allocation of and contention for shared resources in different ways, the codes required for starting a thread must differ and are typically handled by different application programming interfaces. The required differences are not trivial and may each require from five to fifty lines of code per API.

These different methods of starting a thread impose a severe burden on a programmer who must be familiar with the different parameters and permissible values thereof required for each of these system level API's including the code for each and the different parameters and syntaxes peculiar to each of them. In the course of a particular process, at least one of these methods must necessarily be included. In the course of a program, each may be included numerous times. Further, the inclusion of such code into a program may preclude that program from being executed on a system running a different operating system since the required code for corresponding operating system level API's is very likely to be different. Therefore, the difference of operating system level API's effectively prevents the porting of programs between operating systems. This limitation is a severe one as larger networks are implemented which may include data processors which are running different operating systems. Further, full exploitation of the data processing resources of the entire network is impossible when the execution of a particular program or application is limited to only the processors of the network which have a common operating system.

SUMMARY OF THE INVENTION

It is therefore an object of the present invention to provide a single generalized and simplified applications processing interface which can invoke any one of a plurality of intended operating system application programming interfaces for the purpose of executing work on the processor (e.g. starting a session, process or thread).

It is another object of the invention to provide an arrangement which allows a programmer to easily change the type of task which is to be started (e.g. session, process or thread) by use of a single simplified applications programming interface in a higher level system.

It is a further object of the invention to provide a generalized applications programming interface which can be modified to support additional operating systems.

It is yet another object of the invention to provide an applications programming interface which need not contain operating system-specific dependencies in order to allow portability between operating systems.

It is another further object of the invention to provide an application programming interface which will allow higher level programs to be run, without modification, in different or multiple operating system environments.

It is another object of the invention to provide an arrangement which allows a programmer to easily change the manner in which a task or thread is started within a program.

It is a further object of the invention to provide a generalized application programming interface which can be updated to support new operating system based options without substantively altering the higher level program.

It is another further object of the invention to provide an arrangement which will facilitate porting of applications between different operating systems and for translation of programs into versions which can be run on different operating systems.

In order to accomplish these and other objects of the invention, an interface which is generalized to correspond to a group of data processing operations is provided which includes a code conversion means for converting at least one coded parameter used to invoke the interface into a plurality of parameters for control of said data processing operations, and template means for imposing a format on at least two of the parameters.

In accordance with another aspect of the invention, a data processing system is provided including an interface which is generalized to correspond to a group of data processing operations which includes a code conversion means for converting at least one coded parameter used to invoke the interface into a plurality of parameters for control of the data processing operations, and template means for imposing a format on at least two of the parameters.

In accordance with a further aspect of the invention, a method is provided for invoking a selected one of a group of data processing operations by an interface operation including the step of converting a single parameter into a plurality of parameters.

In accordance with another further aspect of the invention, an application program product recorded on a medium and usable with a data processing system, said application program product including an interface which is generalized to correspond to a group of data processing operations, said interface including a code conversion means for converting at least one coded parameter used to invoke said interface into a plurality of parameters for control of said data processing operations, and template means for imposing a format on at least two of said plurality of parameters.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
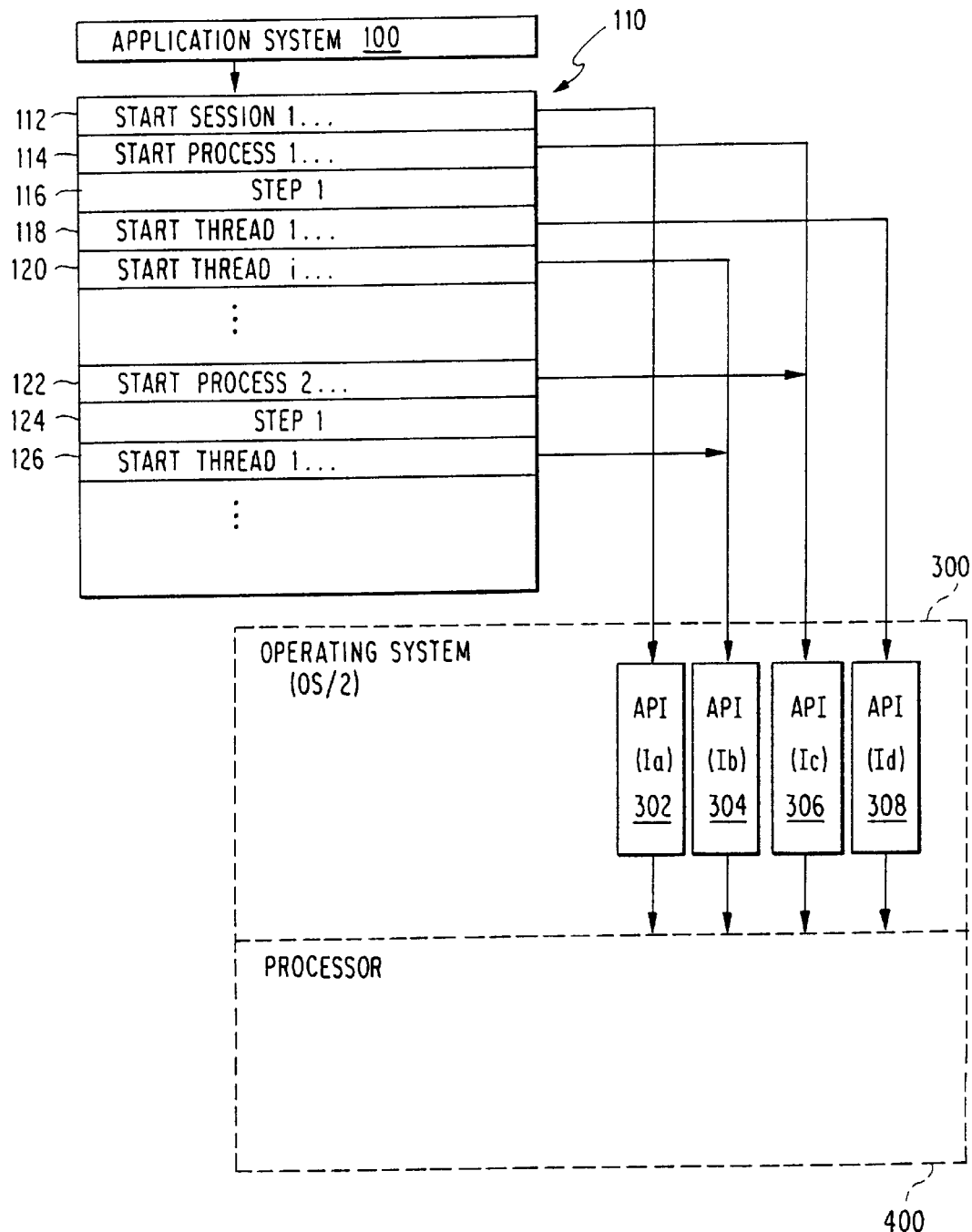
FIG. 1 is a schematic illustration of the prior art relationship between an arbitrary program and prior art application programming interfaces within an operating system for a data processor.

Referring now to the drawings, and more particularly to FIG. 1, there is shown an arbitrary application system 100, which may include one or a plurality of programs 110 made up of or represented by sessions 112, processes 114, 122 containing one or more steps 116, 124 within each process and threads 118, 120, 126 for loading and execution of the processes and steps. For clarity, the thread executed to perform the desired operation (e.g. task or routine) is merely indicated by three dots to the right of each block including a "Start Session", "Start Process" or "Start Thread" legend since, as indicated above, some system level operations are necessary to initiate each thread in the program and threads are necessary to initiate processes which, in turn, constitute sessions. This depiction also reflects the application of the invention to the starting of sessions, processes and threads since it is necessary to use a thread to start a thread. It is the function of the API's, in this case, to start a thread by which a particular routine is run (the identity of the routine corresponding to a session, operation or thread is application-specific and will be generically referred to in the discussion of FIG. 3, below, as TaskApplRoutine). Therefore, in order to execute even simple programs, it is necessary to start and run several different threads in order to execute individual steps of the program and to establish the environment in which the execution of the various steps is to be carried out.

As is well-understood in the art, the program could include a full repetition of code necessary for starting each thread. However, since such code is necessary for each thread, as a matter of programming economy within the operating system 300, it is customary to handle such code as one or more subroutines such as 302–308 within the operating system 300. These subroutines are individually callable to be run on processor 400 and are referred to as application programming interfaces or API's. An operating system will include a wide variety of API's, of which, some will be dedicated to the starting of each of at least processes and threads and the creation of threads and possibly other functions having to do with the internal operation of the processor, such as allocation of processor resources.

Figure 3:
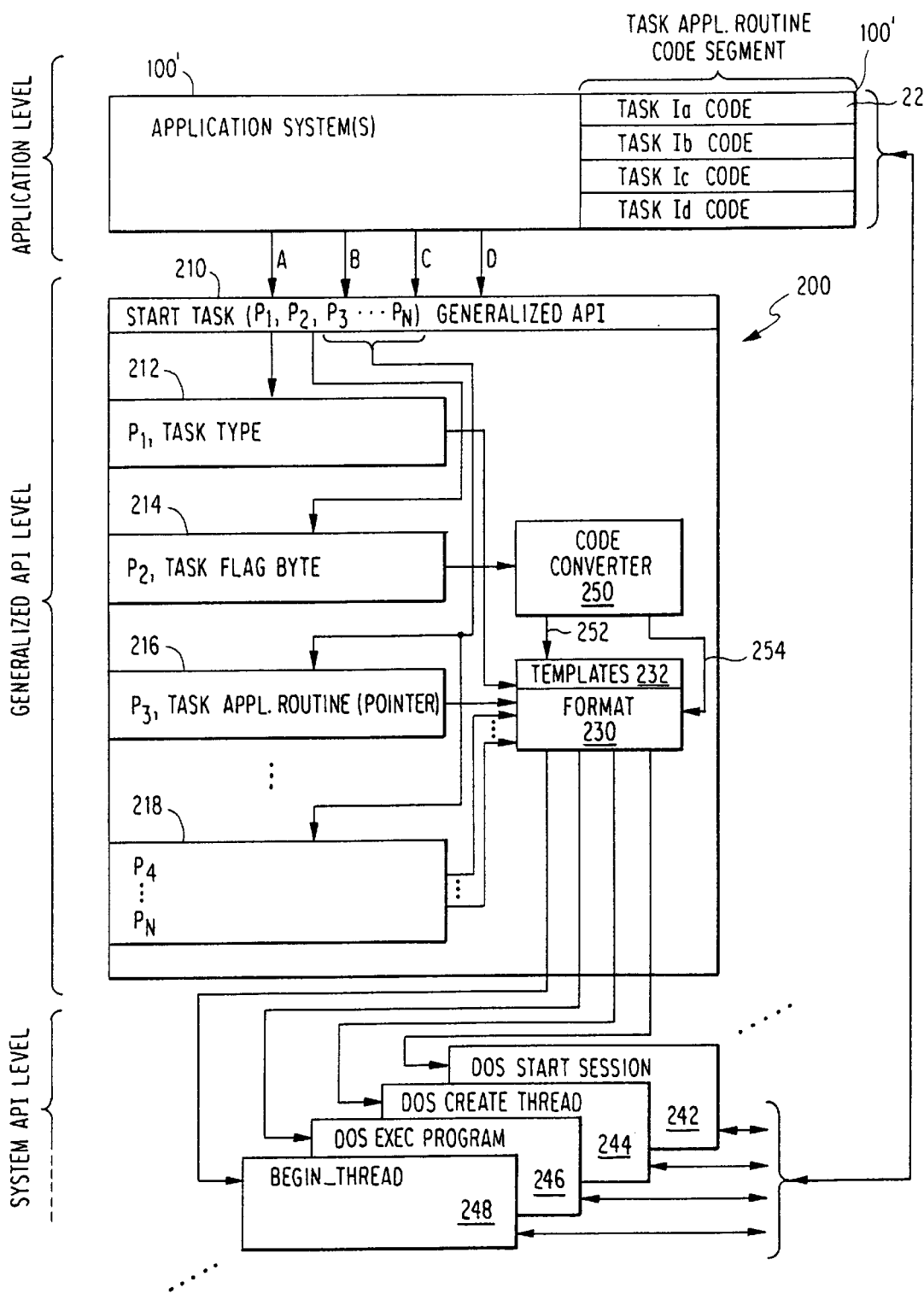
FIG. 3 is a schematic illustration similar to FIG. 1 in which the generalized interface in accordance with the invention is illustrated in detail.

These dedicated operating system level API's 302–308, respectively correspond to DosStartSession 242, DosCreateThread 244, DosExecProgram 246 and begin_thread 248, specifically shown in FIG. 3, in the OS/2™ operating system. Therefore, the lines of program 110 are each associated with one of the operating system API's. Specifically, each Start Session (e.g. 112) in program 110 would invoke API 302 to run, for example task or routine Ia, and each Start Process (e.g. 114, 122) is associated with API 306 to run, for example task or routine Ic. A Start thread is associated with one of two API's 304 or 308, depending on the setting of a flag in the program line as may be appropriate to task or routine Ib or Id.

However, even the economies of program code provided by such API's do not particularly simplify their use by a programmer since each API requires the input of different parameters in order to execute in the manner intended by the programmer. Therefore, the programmer must be familiar with both the operation of each such API available on any intended operating system as well as with the parameters which must be supplied for each API when it is used in a program.

These parameters and the code required for invoking each API also differ between operating systems on which the API is to be executed. Therefore, the programmer must be familiar with the manner of operation and the parameter requirements for each API as it would be implemented on each operating system. Therefore, the number of different API's with which the programmer must be familiar is greatly increased. For example, if each of, say, ten operating systems, like OS/2™, provided four or more (such as the additional "spawn" and "fork" operations in the UNIX™ operating system) different ways of starting threads, the programmer would need to know all the details of each of those API's and the parameters required for their execution. Further, since the required parameters vary with both the operating system and the type of task within which they run, the specification of such parameters for each thread presents a substantial burden for the programmer.

Perhaps more importantly, however, there is no systematic relationship between the various codes, formats and required parameters of API's corresponding to similar operations from operating system to operating system. Therefore, all of the code for calling and executing API's must be rewritten in separate versions of a program for each operating system on which it is to be run. This limitation also prevents the porting of such code between different processors on a network if the processors are using different operating systems.

Figure 2:
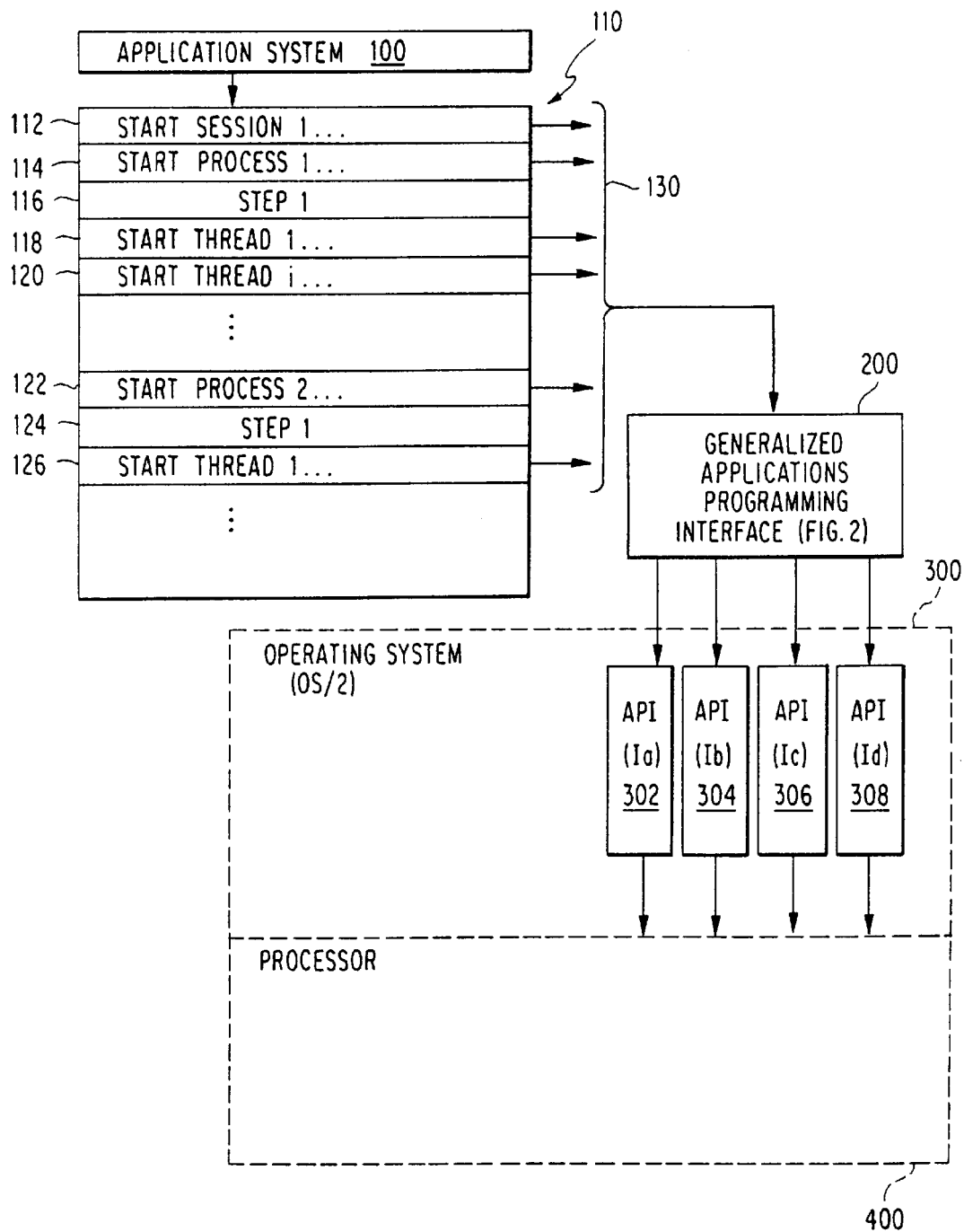
FIG. 2 shows the relationship of the invention to the system elements illustrated in FIG. 1.

Referring now to FIG. 2, there is shown the relationship between the elements illustrated in FIG. 1 and the generalized API in accordance with the present invention. Recognizing that application system 100, operating system 300 and processor 400 represent different levels of the overall system, the generalized API 200 of the present invention is seen to represent an insertion of a further level into the hierarchy of the overall system. Further, as indicated by bracket 130, the single generalized API 200 of the present invention is called for the purpose of starting any of sessions, processes or threads. As to this feature of selectivity of the generalized API of the invention and at a very low level of abstraction, the invention functions somewhat as a shell for these API's. However, it must be understood that such an understanding of the invention would be very incomplete since the invention is also responsive to flags which are contained in a parameter of the code by which it is invoked and supplies appropriate code format and parameters for controlling the operating system level API which the invention invokes. The invention is also applicable to any other group of API's which may be present in the operating system or even several such groups. However, for purposes of clarity, the invention will be explained in connection with the group of API's used in the starting of processes and threads.

This feature of the present invention limits the required knowledge for a programmer to that of a single API for each group of API's to which the invention is applied. The starting of a session, process or thread, at any point in application system 100 where such an action is required, can be done by a common operation, regardless of the internal details of the operating system API 302–308 which is ultimately controlled. As will be explained in greater detail below, this is made possible in accordance with the present invention by the use of a flag byte to supply information to control the output of the generalized API. The generalized API of the invention thus differentiates between the operating system API's to be invoked and supplies the required format and parameters in order to do so. By virtue of this function of the invention, the details of operating system API's are rendered transparent to the programmer. Further, the particular operating system, itself, is made transparent to the extent of all API's to which the invention is applied.

Referring now to FIG. 3, The generalized API according to the invention will be explained in greater detail. During the following discussion, it should be kept in mind that the generalized API of the invention is invoked by name (and, hence, a plurality of generalized API's could be applied to a single operating system) together with a set of parameters which define the type of task to start, specific options and the name of (e.g. A, B, C, D or a pointer to the location of) the application-specific code to be executed within this task, once it is started. It is an important aspect of this invention that individual flags to the operating system API's (such as whether or not the task should run in the "time-critical" mode) are merged into a single "flag byte" which is then translated into the many parameters used to call the operating system API's. Those not supplied by the programmer are supplied to the operating system API's as defaults. It should be noted that none of this information is specific to the operating system but only the application in the names of the respective portions of code in the application system (s) 100' to be executed which are stored in a code segment 100" thereof.

In FIG. 3, one or more application systems 100, each including one or more applications programs 110 (both as shown in FIG. 2) are collectively depicted at 100'. Output to the generalized API 200 of the present invention, bracketed by 130 in FIG. 2, are schematically shown at A, B, C, D, etc., containing an identification of code to be executed as part of the application and corresponding, respectively, to tasks Ia, Ib, Ic, Id, etc., as parameters of a StartTask call to invoke the invention. The extent of the generalized API layer and portions of the next higher and lower levels of the overall system are shown by respective brackets to the left of FIG. 3.

An exemplary name and syntax by which the generalized API of the present invention is invoked is indicated as "StartTask (P1, P2, P3, . . . , Pn)", P1–Pn being parameters of StartTask. For purposes of explanation of the invention, three such parameters are considered to be required in the invention. However, it is to be understood that the parameters may be represented, combined or divided and or encoded in many ways within the scope of the invention and the particular articulation of data representing this information is not critical to the invention. For example, P3 216 and/or P2 214 or any other of a fixed but arbitrary number of parameters 218 could be included in the TaskType, P1 parameter. Conversely, if more coded information was necessary to invoke the desired number of operating system level API's, additional parameters, such as P4, could be used in precisely the same manner as P2. Alternatively, P1 information could be included within coded flag byte P2 since only two bits thereof would be required to select between four operating system level API's. Nevertheless, the illustrated syntax is preferred both for implementation of the invention and clarity of explanation. Upon the invoking of StartTask, these parameters may, but need not be, stored within some data structure or even hardware within or as specified by the generalized API 200. Thus 212–218 could be conceptualized or possibly implemented as registers.

Figure 4:
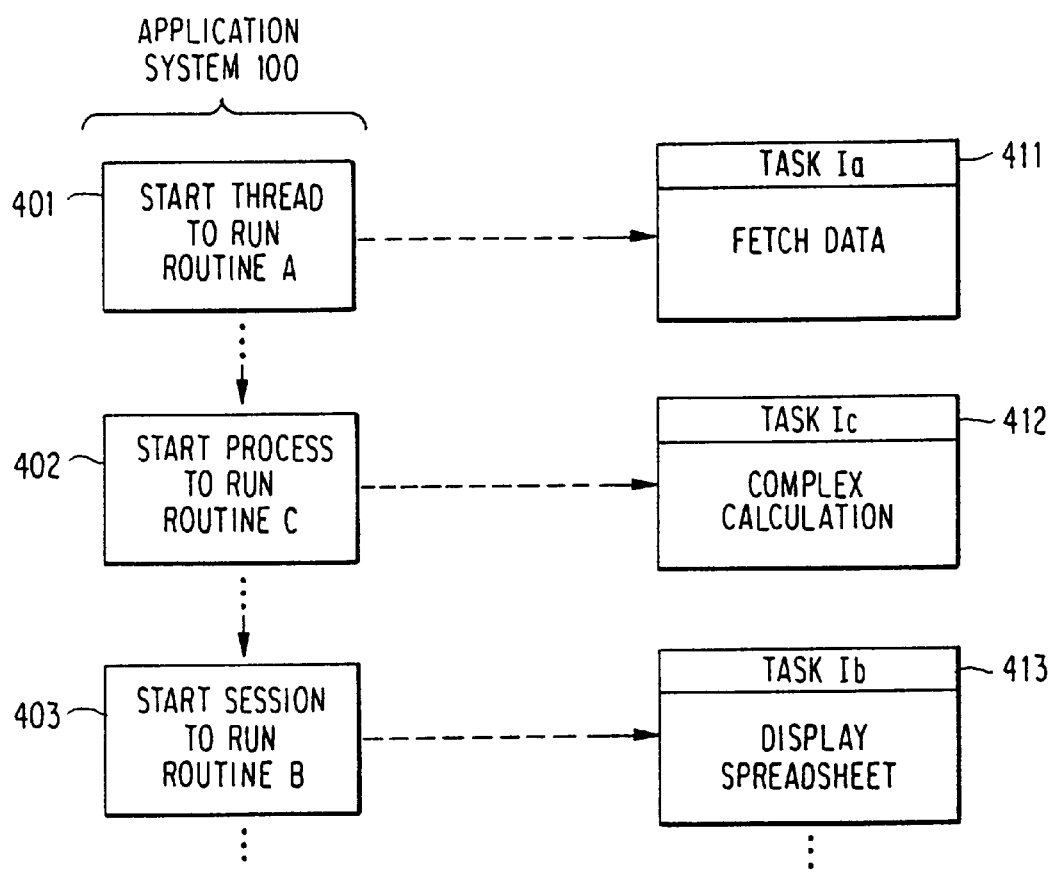
FIG. 4 illustrates the concept of starting tasks in different manners in order to run desired tasks or routines as portions of an applications system.

At this point, it will be helpful to a clear understanding of the invention to review how the individual operations of an application system 100 are carried out. It is particularly important to recognize the distinction between the task or routine to be carried out as a substantive part of the application system and the task which must be started to initiate and perform that task or routine. Referring now to FIG. 4, exemplary steps 401–403, as written by a programmer, are collectively indicated by a bracket and "Application System 100" legend. It is important to note that each of these exemplary steps requires the starting of a thread, process or session and it must be remembered that the starting of a process or session requires the starting of at least one thread. Each of these tasks 401–403 is started for the purpose of running a task or routine which is a substantive part of the application system (e.g. a step or subroutine of a program). Therefore, when each of tasks 401–403 is started, a particular one of tasks Ia, Ib, Ic, etc. is run, as specified in the task 401–403. Therefore, when task 401 is started, in this case as a thread, Task Ia 411 is carried out. When task 402 is started to run task or routine C, in this case as a process, Task Ic 412 is carried out. Similarly, when task 403 is started to run task or routine B, in this case as a session, Task Ib 413 is carried out, and so on.

To emphasize the meritorious effect of the invention, it should be recalled that the different ways of starting tasks 401–403 must be reflected in the application system 100 and must also correspond to the operating system on which the application system is to be run. This is the reason that the programmer would need to have thorough knowledge of the operating system level API's. By virtue of the present invention, any or all of the operating system level API's can be invoked with a single, generalized API. The application system calls the generalized API of the invention and merely specifies the operating system level API desired for the purpose of running the desired task or routine as a parameter of the generalized API. The generalized API, itself, effectively contains all the specific knowledge of the operating system API's that it is capable of invoking.

Returning to FIG. 3, the three essential parameters of StartTask are illustrated as P1, P2 and P3. Parameter P1, TaskType, is used to specify a particular operating system level API 242–248 which determines whether a session, process or thread is to be started in order to run a desired task or routine, the code for which is stored in code segment 100" of application system 100'. Parameter P2, TaskFlagByte, is a compressed and/or encoded parameter which specifies a plurality of parameters which are required to invoke the particular operating system API specified by P1. P3, TaskApplRoutine, is a pointer to a location in the code segment of the application system(s) 100' at which the block of code (e.g. 222) to be run will be found. Other parameters could express flags, options, switches and the like for additional control over either the operating system API's or the tasks or routines to be run as a separate session, process or thread.

Generalized API 200 further contains a formatting arrangement 230, preferably including information in the form of templates 232 which are selected in accordance with a portion of the coded information in the flag byte parameter P2 to correspond to the TaskType parameters P1 which will be recognized by the present invention. The purpose of the formatting means is to accept parameters from selected ones of parameters P3 and P4–Pn and further parameters decoded from the flag byte parameter P2, as will be discussed below, and to place this information into respective locations in a name and parameter list for invoking one of operating system level API's 242, 244, 246 and 248, under control of the task type parameter, P1. It should also be noted that less than all of parameters P4–Pn may be required in the call for any particular task and selection is made under control of the TaskFlagByte parameter 214 at logic block 232 together with the imposition of a template which specifies the syntax and permissible values of the parameters. This selection function may be embodied in hardware as a gate array although a software implementation is preferred.

It should be noted that under OS/2™ and some other operating systems, switches and other controls for a particular thread, process or session are specified as separate parameters. The parameters involved in each API typically differ from other API's in the operating system and differing syntaxes will be involved. Both the parameters and the values, limits and syntaxes thereof will also differ from operating system to operating system. This is the major reason for the extreme difficulty of invoking a plurality of operating system level API's which may perform very similar functions. Flags may also be included and will differ from API to API and operating system to operating system in the same fashion.

An important feature of the invention is the provision of a flag byte (which may conveniently correspond to a byte length, in bits, elsewhere in the system) to contain the parameter and flag information in a highly compressed form as a single parameter. Thus, while the number of possible values for this flag byte parameter may be large, in practice it has been found to be not objectionably so and these values can be quickly learned by a programmer and used far more efficiently than information concerning specific operating system level API's. In any event, since codes are provided corresponding to only acceptable values of the parameters of the operating system level API's, much of the knowledge which would otherwise be required of the programmer is implicit in the flag byte codes. This feature relieves the programmer from the burden of separately providing these multiple parameters each time a thread is started.

Given this above-described architecture for the generalized API of the invention, operation is quite simple. The name StartTask and the fixed but arbitrary number of parameters including the TaskType parameter, the TaskFlag parameter and the TaskApplRoutine parameter invoke the generalized API according to the invention. A task code is accessed and/or synthesized in accordance with the Task-Type and TaskApplRoutine parameters. The TaskFlagByte parameter is decoded at 250 to provide code bits for control of selection at 232 and codes or a pointer to codes for a unique set of parameters to be merged with a template from 232 during formatting. Although not illustrated, the code converter 250 could also contain and selectively provide templates for formatting under additional control of the TaskType parameter. Otherwise, the format template selection signal and control of merger of the information inputted to formatting means 230 is provided over connection 252. The decoded parameter values are provided to formatting means 230 over connection 254.

Once the code is assembled for the starting of a particular task by formatting means 230, one of the operating system level API's 242–248 is invoked by the assembled code corresponding to the session, process or thread being started in accordance with program 210. The desired task is started and a pointer returned for accessing the code of the task or routine (e.g. 222) to be executed, as indicated by the bi-directional links illustrated. It should be noted that the brackets are used to indicate that there is no specific correspondence between tasks 242–248 and tasks or routines Ia–Id. Processing thus proceeds precisely as in the prior art but the programming necessary to achieve such processing has been greatly simplified since only one generalized API is now required to access any of a plurality of operating system API's.

While the generalized API of the invention is of particular applicability for the simplification of programming for the OS/2™ operating system, the architecture of the invention will function in precisely the same way in regard to any operating system. The only difference is in the formats to be implemented in formatting means 230 which must be supplied (and which may be greater than four in number) and output code provided in code converter 250. This information which is specific to the operating system API's need only be changed in the template section of the formatting means (or code converter 250) and code converter 250, respectively, which, for this reason, are preferably configured as look up tables in either hardware or software. Additional selectivity among operating system level API's can be provided from any, all or any combination of parameters P1–P3. In this regard, it should be noted that the name by which the generalized API of the invention is called is not changed in program 110 or any parameters other than, possibly, P1. Even this change of parameter could be avoided by the provision of code conversion similar to that provided for P2 at code converter 250. It is very unlikely that a change of P1 would be required since the overall organization of the application program rather than the operating system that determines whether a thread, process or session is required to be started in order to perform a particular task or routine (e.g. 222). P2 would not need to be changed because appropriate changes would be made at a single location in code converter 250. Similarly, P3 would not need to be changed since it is a pointer to an application-specific portion of code segment 100" and is merely passed through the generalized interface. This lack of need for change of the application system in indicative of the transparency of the operating system to the application system engendered by the invention.

Once these changes have been made in the code converter 250 and template portion 232 of format means 230, preferably by means of the higher level application system (e.g. program 210, which may be embodied as a computer program product or a portion thereof, recorded on a medium such as a tape or disc or within a data processing system for ease or convenience of use), the application system, itself, can then be written or translated to contain only one name with a set of parameters including a coded TaskFlagByte parameter to invoke any of a group of operating system level API's in order to run any desired task or routine (e.g. 222) required by the application system. The code of program 110 is thus placed in a generalized form which can be ported from processor to processor regardless of the operating system existing on the various processors. By the same token, the inclusion of the generalized API of the invention as a subroutine directed to invoking API's of a particular operating system allows the application program to be readily modified to change the operating system on which the program may be run. Similarly, new features incorporated in newer versions of a single operating system may be utilized by an application program by a similar alteration of the output of decoder 250 or the P1 parameter in the application program and the storage of corresponding templates in the interface.

In view of the foregoing, it is seen that the generalized application programming interface according to the invention provides increased ease of programming and updating and translating of high level programs which contain the generalized interface while decreasing the required level of knowledge and skill required of the programmer. The generalized interface further allows the porting of high level programs between different operating system environments which include the generalized interface and is, itself, easily portable therebetween.

While the invention has been described in terms of a single preferred embodiment, those skilled in the art will recognize that the invention can be practiced with modification within the spirit and scope of the invention. For example, the generalized interface can be used to provide a similar transparency and convenience for any group or system level functions or subroutines of a program. The invention can also be used to advantage at other levels of a data processing system or even as a simplified high level shell for a plurality of applications since it is capable of exerting control through switches or separate or encoded parameters to develop control signals and to supply them in a predetermined format to any lower level operations. Accordingly, it is to be understood that the scope of the invention is to be considered as being limited only by the appended claims.

What is claimed is:

1. An interface which is generalized to correspond to a group of data processing operations in any of a plurality of operating systems, said interface including a code conversion means for converting at least one coded parameter of a command used to invoke said generalized interface into a task code and a plurality of parameters for control of said data processing operations in accordance with one of said plurality of operating systems, and template means for imposing a format on at least two of said plurality of parameters in accordance with said one of said plurality of said operating systems, whereby said command may be executed on different operating systems of said plurality of operating systems using the generalized interface.

2. An interface as recited in claim 1, further including means for selecting ones of said plurality of parameters.

3. An interface as recited in claim 2, further including at least one further parameter including an identification of a program operation specified by a program and a process used to start said program operation.

4. An interface as recited in claim 3, wherein said at least one further parameter comprises at least first and second parameters respectively including said identification of a program operation specified by a program and said process used to start said program operation.

5. An interface as recited in claim 4, further including at least one additional parameter.

6. An interface as recited in claim 5, wherein said additional parameter contains at least one on at least one switch and at least one flag.

7. An interface as recited in claim 1, further including at least one further parameter including an identification of a program operation specified by a program and a process used to start said program operation.

8. An interface as recited in claim 7, wherein said at least one further parameter comprises at least first and second parameters respectively including said identification of a program operation specified by a program and said process used to start said program operation.

9. An interface as recited in claim 8, further including at least one additional parameter.

10. An interface as recited in claim 7, wherein said additional parameter contains at least one of at least one switch and at least one flag.

11. A data processing system including an interface which is generalized to correspond to a group of data processing operations in any of a plurality of operating systems, said interface including
    a code conversion means for converting at least one coded parameter of a command used to invoke said generalized interface into a task code and a plurality of parameters for control of said data processing operations in accordance with one of said plurality of operating systems, and
    template means for imposing a format on at least two of said plurality of parameters in accordance with said one of said plurality of said operating systems,
    whereby said command may be executed on different operating systems of said plurality of operating systems using the generalized interface.

12. A data processing system as recited in claim 11, wherein said interface further includes means for selecting ones of said plurality of parameters.

13. A data processing system as recited in claim 12, wherein said interface further includes at least one further parameter including an identification of a program operation specified by a program and a process used to start said program operation.

14. A data processing system as recited in claim 3, wherein said at least one further parameter comprises at least first and second parameters respectively including said identification of a program operation specified by a program and said process used to start said program operation.

15. An interface as recited in claim 14, wherein said interfaces further includes at least one additional parameter.

16. An interface as recited in claim 15, wherein said additional parameter contains at least one on at least one switch and at least one flag.

17. A data processing system as recited in claim 11, wherein said interface further includes at least one further parameter including an identification of a program operation specified by a program and a process used to start said program operation.

18. A data processing system as recited in claim 17, wherein said at least one further parameter comprises at least first and second parameters respectively including said identification of a program operation specified by a program and said process used to start said program operation.

19. A data processing system as recited in claim 18, further including at least one additional parameter.

20. A data processing system as recited in claim 19, wherein said additional parameter contains at least one of at least one switch and at least one flag.

21. A method of invoking a selected one of a group of system operations in any of a plurality of operating systems by an interface operation using an interface which is generalized to correspond to the group of system operations in any of the plurality of operating systems, including the step of
    converting a single parameter of a command used to invoke said interface operation into a task code and a plurality of parameters in accordance with one of said plurality of operating systems and formatted in accordance with said one of said plurality of operating systems,
    whereby said command may be executed on different operating systems of said plurality of operating systems.

22. A method as recited in claim 21, including the further steps of
    providing a name corresponding to one of said system operations in response to a parameter of said interface operation, and
    formatting said name together with at least one of said plurality of parameters.

23. A method as recited in claim 22, including the further step of
    selecting one or more parameters from among said plurality of parameters for formatting with said name.

24. A method as recited in claim 23, including the further step of
    providing an identification of code corresponding to a data processing operation as a parameter of said interface operation.

25. A method as recited in claim 24, wherein said data processing operation is initiated by said system operation.

26. A computer readable medium containing code for providing a generalized interface corresponding to a group of data processing operations in any of a plurality of operating systems, said interface including
    a code conversion section for converting at least one coded parameter of a command used to invoke said interface into a plurality of parameters for control of respective data processing operations of said group of data processing operations in accordance with one of said plurality of operating systems, and
    a template section for imposing a format on at least two parameters of said plurality of parameters in accordance with said one of said plurality of operating systems,
    whereby said command may be executed on different operating systems of said plurality of operating systems using the generalized interface.

27. A computer readable medium as recited in claim 26, wherein said interface further includes a code section for selecting ones of said plurality of parameters.

28. A computer readable medium as recited in claim 27, wherein said interface further includes at least one further parameter including an identification of a program operation specified by an application and a process used to start said program operation.

29. A computer readable medium as recited in claim 28, wherein said at least one parameter comprises at least first and second parameters respectively including said identification of a program operation and said process used to start said program operation.

30. A computer readable medium as recited in claim 29, wherein said interface further includes at least one additional parameter.

31. A computer readable medium as recited in claim 30, wherein said additional parameter contains at least one of at least one switch and at least one flag.

32. A computer readable medium as recited in claim 26, wherein said interface further includes at least one further parameter including an identification of a program operation specified by an application and a process used to start said program operation.

33. A computer readable medium as recited in claim 32, wherein said at least one parameter comprises at least first and second parameters respectively including said identification of a program operation and said process used to start said program operation.

34. A computer readable medium as recited in claim 33, wherein said interface further includes at least one additional parameter.

35. A computer readable medium as recited in claim 34, wherein said additional parameter contains at least one of at least one switch and at least one flag.

* * * * *